(12) United States Patent
Krampitz

(10) Patent No.: US 6,650,120 B2
(45) Date of Patent: Nov. 18, 2003

(54) APPARATUS AND METHOD FOR ACCESSING DATA STORED WITHIN A POWER SOURCE

(75) Inventor: Scott Krampitz, Blooming Prairie, MN (US)

(73) Assignee: SPX Corporation, Charlotte, NC (US)

( * ) Notice: Subject to any disclaimer, the term of this patent is extended or adjusted under 35 U.S.C. 154(b) by 141 days.

(21) Appl. No.: 10/011,716

(22) Filed: Dec. 11, 2001

(65) Prior Publication Data

US 2003/0085713 A1 May 8, 2003

Related U.S. Application Data

(60) Provisional application No. 60/331,072, filed on Nov. 7, 2001.

(51) Int. Cl.[7] ............................................. G01N 27/416
(52) U.S. Cl. ....................................................... 324/426
(58) Field of Search ................................. 324/426, 427, 324/430, 433

(56) References Cited

U.S. PATENT DOCUMENTS

| | | | |
|---|---|---|---|
| 4,193,025 A | 3/1980 | Frailing et al. | 324/427 |
| 5,572,136 A | 11/1996 | Champlin | 324/426 |
| 6,091,245 A | 7/2000 | Bertness | 324/426 |
| 6,163,156 A | 12/2000 | Bertness | 324/426 |
| 6,172,505 B1 | 1/2001 | Bertness | 324/430 |
| 6,323,650 B1 | 11/2001 | Bertness et al. | 324/426 |
| 6,332,113 B1 | 12/2001 | Bertness | 702/63 |

Primary Examiner—Edward H. Tso
(74) Attorney, Agent, or Firm—Baker & Hostetler LLP

(57) ABSTRACT

An apparatus and method for determining the status of a stand-alone power source, which includes a communications port that attaches to the power source, a processor linked to the communications port to process the data and output device to view the data. Additionally, a charger can be incorporated as a dual function to better diagnosis the power source as well as a means for charging the power source.

47 Claims, 4 Drawing Sheets

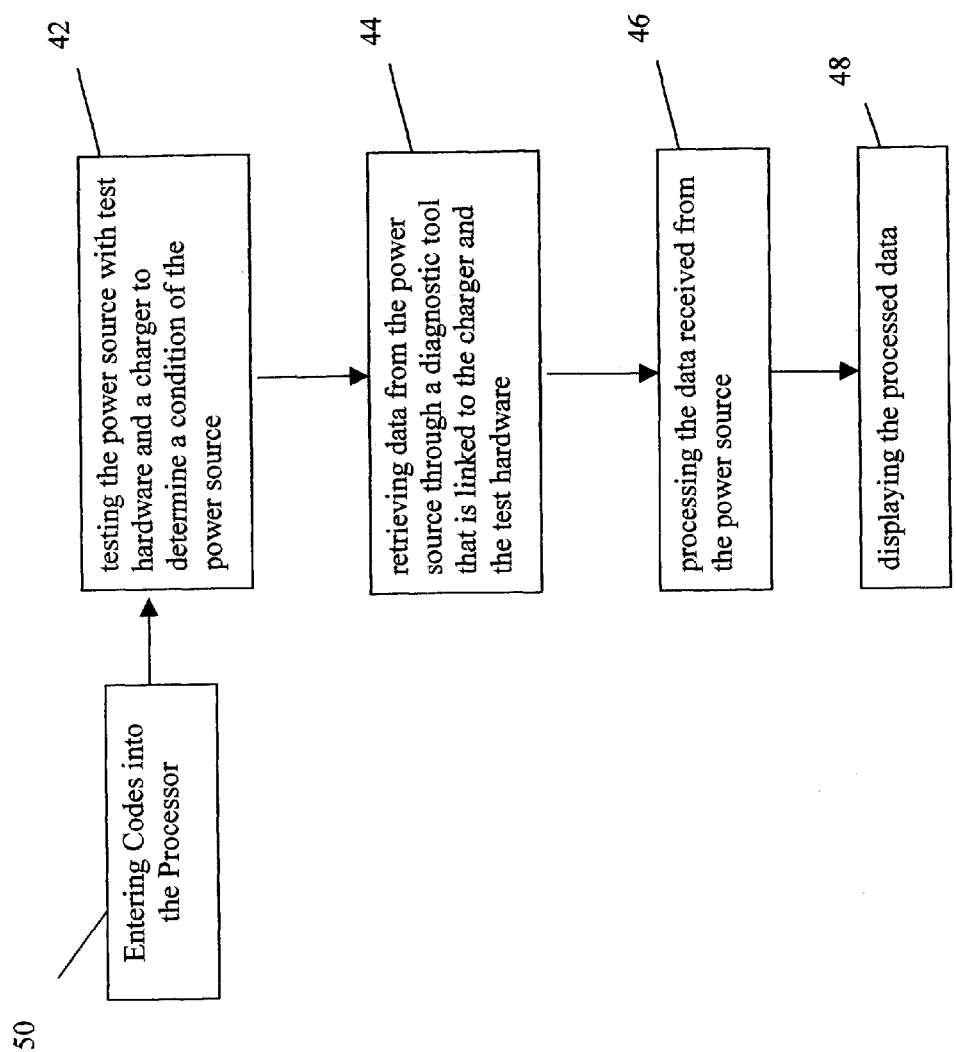

APPARATUS AND METHOD FOR ACCESSING DATA STORED WITHIN A POWER SOURCE

PRIORITY

This application claims priority to the provisional U.S. patent application entitled, APPARATUS AND METHOD FOR DIAGNOSTIC INTERFACING WITH A POWER SOURCE, filed Nov. 7, 2001, having a Serial No. 60/331,072, the disclosure of which is hereby incorporated by reference.

FIELD OF THE INVENTION

The present invention relates generally to a diagnostic tool. More particularly, the present invention relates to an adaptive power source diagnostic tool for determining and managing data.

BACKGROUND OF THE INVENTION

Among the standard options in a modern automobile are power steering, power brakes, an automatic transmission, electric windows and doors, and computer software and hardware. All of these additions plus many more have made great demands on the vehicles power system. Improvements in battery technology have resulted in large capacitance and loads and longer abilities to hold and retain a charge.

Further advances in battery technology have resulted in integrated circuitry being incorporated into the battery. This integrated circuitry communicates with a power management system in the automobile. The purpose for this circuitry is to manage the charge and power consumption of the battery. Some batteries on the market even have the capability to store information and perform self-diagnostics. This information is then communicated to the power management system.

In order to retrieve information from these types of batteries, one needs to tap into the diagnostic information generated by the circuitry to get the data. Tapping into the diagnostic information is not always possible especially on a stand-alone battery. Additionally, those who need access to the diagnostic information do not have the means to access it. A tool is needed for battery shops and the like to evaluate batteries for replacement or reconditioning that is low cost and does not require the ability to retrieve the data via the vehicle network.

Accordingly, it is desirable to provide a tool that can extract or pull this data from a battery that is not connected to the power management system. Furthermore, it is desirable to provide a tool that can extract this information from a battery and take corrective measures such as charging the battery as needed.

SUMMARY OF THE INVENTION

In a first aspect of the present invention, a diagnostic apparatus that determines specific information as well as the status of a stand-alone power source is provided. The apparatus includes a communications port that attaches to a power source data port through which it receives data, a processor, which processes the data to determine information about the power source, is linked to the communications port and an output device that displays the information determined by the processor. The main feature of the invention allows a user to extract information from the stand-alone battery.

In another aspect of the present invention, an input device to enter codes is provided. The codes can be data or instructional. The latter instructs the processor to perform specific jobs with respect to the power source.

In another aspect of the present invention, a method for determining and managing the status of a stand-alone power source is provided. The method includes the steps of retrieving data from the power source through a communications port that attaches to a power source data port, processing the data received from the power source data port and displaying the processed data. A further step to this method is entering data or instructional codes into the processor.

In another aspect of the present invention, an apparatus determines specific information and the status of a stand-alone power source. The apparatus includes means for retrieving data from a power source data port, means for processing the data received from the power source and means for displaying the processed data. A further element of the apparatus is a means for entering codes into the processor.

In another aspect of the present invention, a diagnostic apparatus for determining specific information and the status of a stand-alone power source is provided. The apparatus includes a charger that attaches to the power source, test hardware that is linked to the charger for testing a condition of the power source and a diagnostic tool that is linked to the power source, charger and test hardware. The diagnostic tool retrieves and processes data from the power source.

The diagnostic tool, in the preferred embodiment, includes a power communications port that attaches to the power source data port through which it receives data, a processor that uses the data to determine information about the power source and an output device that displays the information determined by the processor.

The charger is employed in conjunction with the test hardware to determine various states of the battery. These elements, in the preferred embodiment, perform a variety of testing procedures. One such test is capacitance, which is accomplished through a method known in the art as loading.

In another aspect of the present invention, the power source is able to charge the power source. The power source can be upon command or it can be charged upon retrieving and processing the relevant information. The present invention, through the processor, determines from the data whether to proceed with charging the battery or not.

In a further aspect of the present invention, the ability to plug-in or communicate with the vehicle power management system is provided. To accomplish this, the inventor provides a vehicle communications port. The port serves as a conduit for transferring data to a processor for evaluation purposes.

In accordance with another embodiment of the present invention, a method is provided for determining the condition of a power source. The steps include testing the power source with test hardware and a charger to determine conditions of the power source, retrieving data from the power source through a diagnostic tool that is linked to both the charger and the test hardware, processing the data received from the power source and displaying the processed data. Further steps to this method are entering codes into the diagnostic tool and retrieving data from a vehicle communications port connector.

In accordance with an alternate embodiment of the present invention, an apparatus is provided for determining the condition of a power source. The apparatus includes a means for charging the power source, means for testing the power source, which is connected to the means for charging, means for retrieving data from the power source, means for processing the data received from the power source and means for displaying the processed data. Further elements are means for entering codes into the means for processing and means for retrieving data from a vehicle power management system.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a flowchart illustrating the step that may be followed in accordance with an alternate embodiment of the present inventive method or process.

DETAILED DESCRIPTION OF PREFERRED EMBODIMENTS OF THE INVENTION

A preferred embodiment of the present invention provides an apparatus and method for determining the status and condition of a stand-alone power source.

Figure 1:
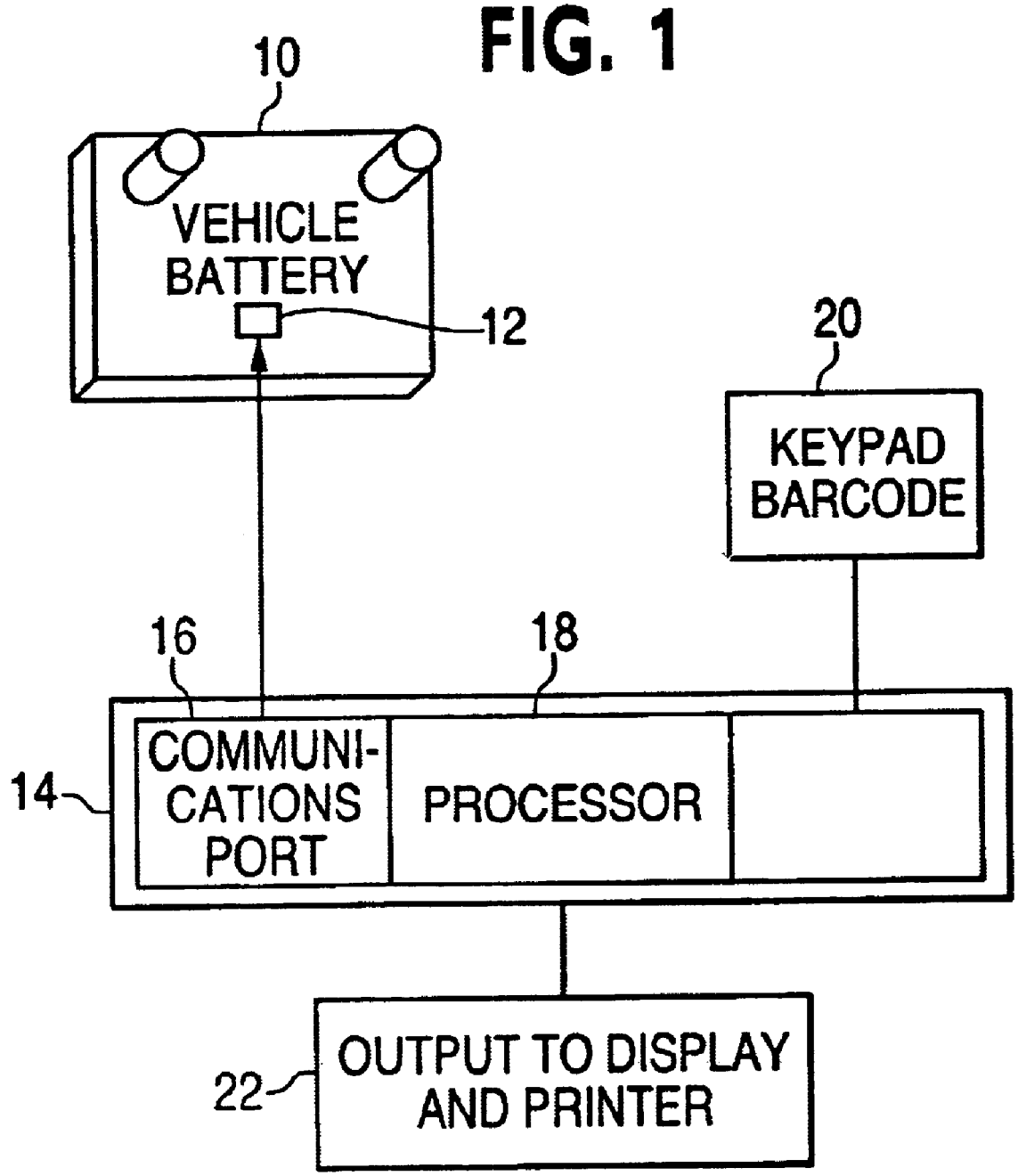
FIG. 1 provides a plan view illustrating elements of a preferred embodiment of the present invention.

A preferred embodiment of the present inventive apparatus and method is illustrated in FIG. 1. A power source 10 with integrated circuitry contains a power source data port 12. A diagnostic tool 14 links or connects to the power source 10 through the power source data port 12 in order to retrieve the data stored therein. In the preferred embodiment, the power source 10 is a vehicle battery with integrated circuitry.

The diagnostic tool 14 is comprised of a communications port 16 and a processor 18. The communications port 16 is a serial input port that connects to the power source data port 12 on the power source 10. Through this connection, data is transferred from the power source 10 into the processor 18.

In the preferred embodiment, the processor includes an input device 20 for the entry of codes or data. The codes instruct the processor 18 to retrieve specific data about the power source 10.

Data entry into the processor 18 can be the informational data concerning the power source. The informational data can be the manufacturer, type of power source 10, voltage and amperage. These codes are entered into the input device 10 and directly into the processor 18.

The input device 20, in the preferred embodiment, is a keypad. However, it also can be an infrared scanner or any other device capable of data entry into the processor 18.

After the diagnostic tool 14 is linked to the power source 10 via the serial communication port 12 and communications port 16, a communications session is initiated. The processor 18 begins to request and download data stored in the power source 10. The processor 18 emulates a power management system to which the power source 10 is generally attached to retrieve the data. The processor 18 communicates with multiple protocols that are typically used by power sources. The data is extracted, formatted and displayed in a matter that is useful for power source diagnosis. The information is also integrated into algorithms that use the data from the inputs to further increase the accuracy of battery diagnosis.

The data retrieved from the battery is transmitted to the processor 18. The data is then made available to a user of the invention via an output device 22. In the preferred embodiment, the output device 22 is a combination of a visual display, such as a monitor, and a printer. This enables a user of the diagnostic tool to immediately visualize the result or have a hard copy of the results.

In the preferred embodiment, the diagnostic tool 14 is a hand-held device that is easily transportable. The diagnostic tool 14 can be integrated into a console type tester or a battery charger. However, the device is manufactured or incorporated, it fills a need for retailers and battery shops to evaluate a battery for replacement or reconditioning. The potential customer generally does not have the capability to retrieve data via a vehicle power management network.

Figure 2:
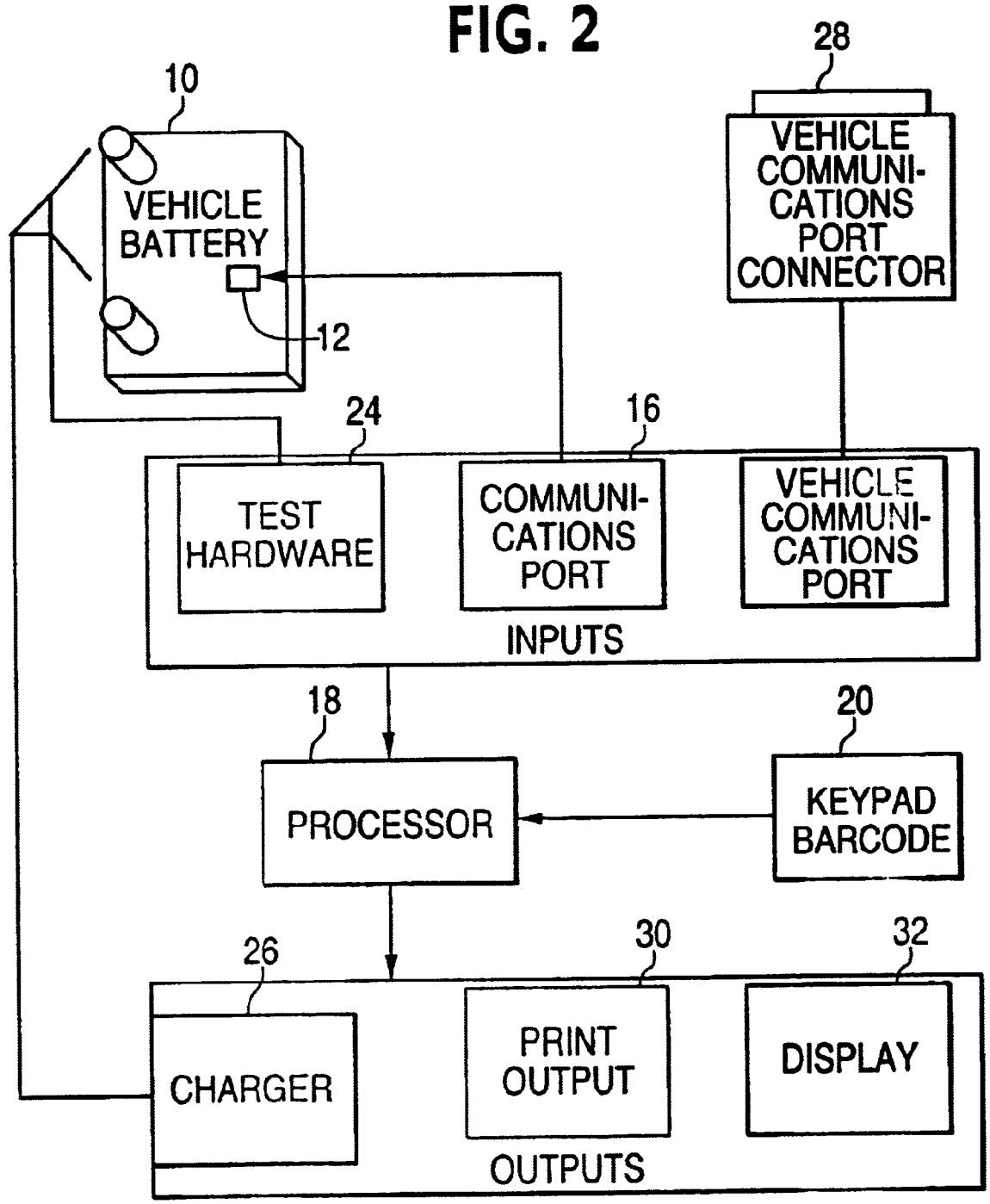
FIG. 2 provides a plan view illustrating elements of an alternate embodiment of the present invention.

FIG. 2 provides a block diagram illustrating elements of an alternate embodiment of the present invention. In this alternate embodiment, the power source 10 with integrated circuitry is linked or attached to the power source data port 12 through the communications port 16. Additionally, test hardware 24 is linked to the power source 10. The test hardware 24 links to the power source 10 with a battery charger 26.

The test hardware 24 operates in conjunction with the battery charger 26 to analyze various states or conditions of the battery. The battery charger 26 charges the battery, which allows the diagnostic tool to better identify the condition of a battery or power source. The diagnostic tool 14 combined with the tests of the internal capacitance via such methods as loading and conductance help derive the overall condition of the battery.

In the alternate embodiment, the diagnostic tool 14 includes a vehicle communications port 28 that is used to further derive the overall condition of the battery. The vehicle communications port 28, interfaces with the power management system of the vehicle and extracts the data of the battery. This data, as well as the data from the communications port 16, is transmitted into the processor 18. From the processor 18, it is displayed or integrated into algorithms that uses the data to further increase the accuracy of the battery diagnosis The alternate embodiment includes an input device 20, which is used for entering codes into the processor 18. The codes can be instructional or data in nature. The instructional codes instruct the processor 18 to conduct a certain test or retrieve a specific piece of data from the battery. Data codes impart informational details to the diagnostic tool 16 such as battery amperage, voltage and manufacturer.

Once data is transmitted to the processor 18, it is made available to the user through an output device 22. In the alternate embodiment, the output device 22 is comprised of a printer 30 and display 32. Therefore, the user has immediate access to the data.

As in the previous example of the device being used on the retail level, the printer 30 gives the battery retailer a hard copy of the data to provide to a customer. The battery retailer is able to give the customer a better indication as to the battery condition and possible replacement.

Figure 3:
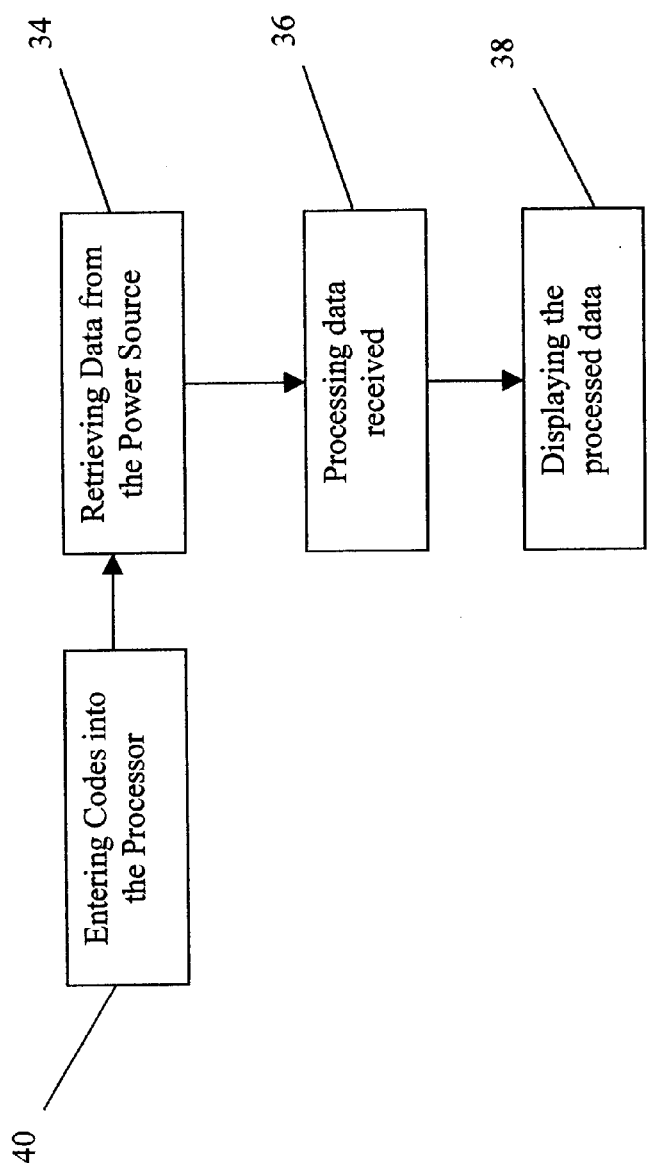
FIG. 3 is a flowchart illustrating the steps that may be followed in accordance with one embodiment of the present inventive method or process.

FIG. 3 is a flowchart illustrating the steps that may be followed in accordance with one embodiment of the present inventive method or process. The method includes the initial step of retrieving 34 data from a stand-alone power source 10. In the preferred embodiment, the data is retrieved by connecting a diagnostic tool 14 to the power source data port 12 on the power source 10.

The diagnostic tool 12 links or attaches to the power source 10 through the communications port 16. Once connected, a communications session in initiated to retrieve the data.

After retrieving the data, the next step is processing 36 the data received. The data is processed by a processor 18 to aid in evaluating the condition of the power source 10.

The next step in the method is displaying 38 the processed data. Once the data is processed, it is made available to the user through an output device 22. In the preferred embodiment, the method utilizes the combination of a visual display and a printer. The visual display can be a liquid crystal display, light emitting diode display or monitored display.

An optional step in the method is entering 40 codes into the processor. The codes instruct the processor 18 or provide factual data. The instructions to the processor instruct the diagnostic tool 16 to retrieve specific data from the power source 10. The factual data can be the voltage, amperage or even the manufacturer.

FIG. 4 is a flowchart illustrating the step that may be followed in accordance with an alternate embodiment of the present inventive method or process. The method includes testing 42 the power source 10 with test hardware 24 and a charger 26 to aid in determining the condition of power source 10. The test hardware 24 works in conjunction with the charger to determine various conditions of the battery such as capacitance through methods such as loading and conductance.

The next step in the method is retrieving 44 data from the power source 10 through the use of the diagnostic tool 16, which is linked to the charger 26 and the test hardware 24. The diagnostic tool 16 uses the data gathered from the battery as well as the data collected from charging and recharging the battery.

Information is also retrieved from the vehicle power management system through the vehicle communications port 28. This means the battery can remain in the vehicle for testing. The reason for tapping into the vehicle power management system along with linking to a battery is that it provides additional data collected on the battery. This, in the end, provides for a better diagnosis.

The next step is processing 46 the data upon receiving it. The processor 18 formats the extracted data as well as integrates it into algorithms to further increase the accuracy of battery diagnosis.

Displaying 48 the data is then accomplished by sending it to an output device 22. The output device 22 can be a printer 30 or a visual display device 32. In either instance, the data is made available to a user for diagnosing purposes.

An optional step in the method is entering 50 codes into the processor. The codes instruct the processor 18 or provide factual data. The instructions to the processor instruct to retrieve specific data from the power source 10. The factual data can be the voltage, amperage or even the manufacturer.

The many features and advantages of the invention are apparent from the detailed specification, and thus, it is intended by the appended claims to cover all such features and advantages of the invention that fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic apparatus that determines specific information and the status of a stand-alone power source, comprising:

a communications port that attaches to a power source data port through which it receives data;

a processor linked to the communications port that processes the data to determine information about the power source, the processor is configured to emulate a power management system; and an output device that displays the information determined by the processor.

2. The apparatus as in claim 1, wherein the power source is a battery.

3. The apparatus of claim 1, further comprising an input device that allows codes to be entered into the apparatus.

4. The apparatus of claim 1, wherein the output device is a display.

5. The apparatus of claim 1, wherein the output device is a printer.

6. The apparatus of claim 1, wherein the communications port is a serial port.

7. The apparatus of claim 1, wherein the communications port is a parallel port.

8. A method for determining and managing the status of a stand-alone power source comprising:

emulating a power management system with a processor;

retrieving data from the power source through a communications port that attaches to a power source data port;

processing the data received from the power source data port; and displaying the processed data.

9. The method as in claim 8, wherein the step of processing the data is accomplished with a processor.

10. The method as in claim 9, further comprising entering codes into the processor.

11. The method of claim 8, wherein the step of displaying the data utilizes a display.

12. The method of claim 8, wherein step of displaying the data utilizes a printer.

13. The method of claim 8, wherein the communications port is serial port.

14. The method of claim 8, wherein the communication port is a parallel port.

15. A diagnostic apparatus that determines specific information and the status of a stand-alone power source, comprising:

means for emulating a power management system;

means for retrieving data from a power source data port, the means for retrieving data is linked to the means for emulating;

means for processing the data received from the power source is linked to the means for emulating; and means for displaying the processed data is linked to the means for emulating.

16. The apparatus as in claim 15, wherein the means for processing the data is a processor.

17. The apparatus as in claim 15, further comprising means for entering codes into the processor.

18. The apparatus of claim 15, wherein the means for displaying the data is a display.

19. The apparatus of claim 15, wherein the means for displaying the data is a printer.

20. The apparatus of claim 15, wherein the communication port is a serial port.

21. The apparatus of claim 15, wherein the communication port is a parallel port.

22. A diagnostic apparatus that determines specific information and the status of a stand-alone power source, comprising:

a charger that attaches to the power source;

test hardware that is linked to the charger for testing a condition of the power source;

a diagnostic tool that is linked to the power source, charger and test hardware to retrieve and process data concerning the power source, the diagnostic tool emulates a power management system.

23. The apparatus as in claim 22 wherein the diagnostic tool comprises a power communications port that attaches to the power source data port through which it receives data, a processor that uses the data to determine information about the power source, and an output device that displays the information determined by the processor.

24. The apparatus as in claim 22 wherein the test hardware tests the capacitance of the battery with the charger.

25. The apparatus as in claim 24 wherein the test hardware tests the capacitance of the battery by loading.

26. The apparatus as in claim 23, wherein the charger charges the power source.

27. The apparatus as in claim 26, wherein the charger charges the power source upon criteria being met by the information processed by the processor.

28. The apparatus as in claim 22, wherein the power source is a battery.

29. The apparatus as in claim 22 further comprising a vehicle communications port connector.

30. The apparatus as in claim 23 wherein the output device is a monitor.

31. The apparatus as in claim 23 wherein the output device is a printer.

32. The apparatus as in claim 22 further comprising an input device to enter codes into the diagnostic tool.

33. A method for determining the condition of a power source comprising:

emulating a power management system;

testing the power source with test hardware and a charger to determine a condition of the power source;

retrieving data from the power source through a diagnostic tool that is linked to the charger and the test hardware;

processing the data received from the power source; and displaying the processed data.

34. The method as in claim 33 further comprising entering codes into the diagnostic tool.

35. The method as in claim 34 wherein the codes are identifying what test to perform on the power source.

36. The method as in claim 33 wherein the test hardware performs an internal capacitance test on the battery.

37. The method as in claim 36 wherein capacitance is determined by loading the power source.

38. The method as in claim 33 further comprising retrieving data from a vehicle communications port connector.

39. A apparatus for determining the condition of a power source comprising:

means for emulating a power management system;

means for charging the power source;

means for testing the power connected to the means for charging to determine a condition of the power source;

means for retrieving data from the power source;

means for processing the data received from the power source; and means for displaying the processed data.

40. The apparatus as in claim 39 further comprising means for entering codes into the means for processing.

41. The apparatus as in claim 40 wherein the codes are identifying what test to perform on the power source.

42. The apparatus as in claim 41 wherein the means for testing performs an internal capacitance test on the battery.

43. The method as in claim 42 wherein capacitance is determined by loading the power source.

44. The method as in claim 39 further comprising means for retrieving data from a vehicle power management system.

45. The method as in claim 44 wherein the means for retrieving is a serial port.

46. The method as in claim 39 wherein the means for displaying is a monitor.

47. The method as in claim 39 wherein the means for displaying is a printer.

* * * * *